United States Patent Office 3,770,738
Patented Nov. 6, 1973

3,770,738
HYDRAZIDES
Colin Elliott Marks, Quorn, and Michael Arthur Smith, Loughborough, England, assignors to Fisons Limited, Suffolk, England
No Drawing. Filed Feb. 8, 1971, Ser. No. 113,770
Int. Cl. C07d 51/04
U.S. Cl. 260—250 A 9 Claims

ABSTRACT OF THE DISCLOSURE

Cyclic carboxylic acid hydrazides are produced by reacting an azine with a dicarboxylic acid or the anhydride thereof.

The present invention relates to a process for the production of cyclic carboxylic acid hydrazides.

Cyclic carboxylic acid hydrazides, particularly maleic hydrazide, have become widely used inter alia as plant growth control agents. It has now been found that these hydrazides may be readily prepared by reaction of the dicarboxylic acid or anhydride thereof with an azine.

Accordingly, the present invention provides a process for the production of cyclic carboxylic acid hydrazides which comprises reacting a dicarboxylic acid or the anhydride thereof with an azine.

Examples of suitable dicarboxylic acids include maleic acid, succinic acid, phthalic acid, $\alpha,\beta$-naphthalenedicarboxylic acid and the like, and suitable anyhdrides include the anhydrides of the above acids. Preferably maleic acid or maleic anhydride is used.

A wide range of azines may be used. Suitable azines include di-lower alkyl ketone azines for example, dimethyl ketazine, methyl ethyl ketone azine, methyl propyl ketone azine and di-ethyl ketone azine, and cyclohexanone azines, for example cyclohexanone azine and the like. Generally it is preferred to use methyl ethyl ketone azine.

The molar ratio of dicarboxylic acid or anhydride to azine does not appear to be critical but is suitably in the range 0.5 to 2:1, and preferably in the range 1 to 1.4:1.

The reaction is conveniently carried out in aqueous solution and at an elevated temperature. Suitably the reaction is carried out at the boiling point of the reaction mixture. A ketone is formed from the azine during the reaction and this is suitably removed by distillation during the reaction. Ketones having boiling points too high to enable them to be removed by distillation may be removed by extraction with a water-immiscible solvent. However, in general, it is preferred to use azines which liberate a ketone which can be removed by distillation. After completion of the reaction, the hydrazide may be collected by cooling and separating the solid by filtration or any other suitable means.

The following examples, in which all parts and percentages are by weight, are given by way of illustration only.

EXAMPLE 1

140 parts methyl ethyl ketone azine (1 mol) were added dropwise to a refluxing solution of 127 parts maleic acid (1.1 mols) in 450 parts water. Liberated methyl ethyl ketone was constantly removed from the reaction mixture as the aqueous azeotrope at a head temperature of 73–75° C., corresponding to a mixture of 88.7% methyl ethyl ketone and 11.3% water. 160 parts of the azeotrope were removed during the reaction. When no more ketone could be liberated, the reaction mixture was cooled to 10° C. and the solid maleic hydrazide filtered off, washed and dried.

The yield of maleic hydrazide, which had a melting point of 314° C., was 101 parts (90% theory).

EXAMPLE 2

128 parts dimethyl ketazine (1 mol) were added dropwise to a refluxing solution of 163 parts phthalic anhydride in 400 parts water. Liberated acetone was continuously removed from the reaction mixture. When no more ketone could be liberated, the reaction mixture was cooled to 10° C. and the solid phthalic hydrazide filtered off, washed and dried.

The yield of hydrazine, M.P. 334° was 110 parts.

We claim:
1. A process for the production of a cyclic carboxylic acid hydrazide which comprises reacting at elevated temperatures an azine selected from the group consisting of di-lower alkyl ketone azines and cyclohexanone azine, with at least one compound selected from the group consisting of maleic acid, succinic acid, phthalic acid, $\alpha,\beta$-naphthalene dicarboxylic acid, and the anhydrides thereof.
2. A process according to claim 1 wherein the azine is selected from dimethyl ketazine, methyl ethyl ketone azine, methyl propyl ketone azine, di-ethyl ketone azine and cyclohexanone azine.
3. A process according to claim 1 wherein the molar ratio of the dicarboxylic acid or anhydride to the azine is in the range 0.5 to 2:1.
4. A process according to claim 3 wherein the molar ratio is in the range 1 to 1.4:1.
5. A process according to claim 1 wherein the reaction is carried out in aqueous solution.
6. A process according to claim 1 wherein the reaction is carried out at the boiling point of the reaction mixture.
7. A process according to claim 1 wherein a ketone formed during the reaction is removed by distillation during the reaction.
8. A process according to claim 1 wherein a ketone formed during the reaction is removed by extraction with a water-immiscible solvent.
9. A process according to claim 1, wherein the compound reacted with the azine is selected from the group consisting of maleic acid, succinic acid, phthalic acid and $\alpha,\beta$-naphthalene dicarboxylic acid.

References Cited
UNITED STATES PATENTS
2,846,433   8/1958   Pennino ---------- 260—250 A NICHOLAS S. RIZZO, Primary Examiner U.S. Cl. X.R.
260—250 R